INVENTORS T. M. QUINN
J. E. YATES
BY John C Albrecht
ATTORNEY

United States Patent Office 3,566,366

Patented Feb. 23, 1971

3,566,366

SELECTIVE EXECUTION CIRCUIT FOR PROGRAM CONTROLLED DATA PROCESSORS

Thomas M. Quinn, West Chicago, and John E. Yates, Glen Ellyn, Ill., assignors to Bell Telephone Laboratories, Incorporated, Murray Hill and Berkeley Heights, N.J., a corporation of New York Filed Oct. 25, 1968, Ser. No. 770,718
Int. Cl. G06f *9/06*
U.S. Cl. 340—172.5 5 Claims

ABSTRACT OF THE DISCLOSURE

In a stored program computer employing both half word length instructions and full word length instructions, a circuit arrangement is disclosed for selectively omitting execution of no-operation half word length instructions. The second instruction of a pair of half word length instructions is decoded during execution of the first instruction of the pair and an output signal is generated when the second instruction is a no-operation instruction. The output signal causes the computer to obtain a next instruction word or pair of instruction words from memory without execution of the no-operation instruction.

BACKGROUND OF THE INVENTION

Some stored program controlled computer systems employ instruction words of various lengths, i.e., more bits are required to specify some instructions than others. When storing instructions of various lengths in a memory in which each memory address location stores a word of a predetermined number of bits, some locations may contain more than one instruction. For example, a memory address location may contain either one full word length instruction having the same number of bits as are available in a memory address location, or two half word length instructions each having half as many bits as are available in a memory address location.

In some systems a full word length instruction may be divided between two consecutive memory address locations, while in other systems each full word length instruction must be assigned a new memory address location. In systems of the latter type, it is necessary to add some dummy half word instructions in order to adjust the word boundaries such that each full word instruction may be stored in a new address location. For example, in a sequence of instruction words in which a full word length instruction is followed by a half word length instruction which in turn is followed by a full word length instruction, additional bits must be inserted in order to fill the address location in which the half word instruction of the sequence is stored. It is common practice to insert a NO-OP instruction where such filling is required. The NO-OP instruction is typically an instruction which when executed by the computer causes no significant changes in any part of the computer or its environment.

In real time computers which must perform a specified task within a predetermined period of time (e.g., central processor for a telephone switching system), it is important that the time for performance of each task be kept to a minimum. Since execution of a NO-OP instruction causes the computer to consume system time without accomplishing useful work, it is desirable to skip the dummy NO-OP instructions which are used to fill memory space. The combination of half word length and full word length instructions is used in many commercial computers. The prior art teaches the use of NO-OP instructions for the purpose of adjusting word boundaries but does not teach how to prevent the loss of systm real time which results from the execution of such dummy NO-OP instructions.

Accordingly, it is an object of this invention to omit the execution of instructions which do not result in useful work.

SUMMARY OF THE INVENTION

In accordance with this invention, the second word of a pair of instruction words obtained from a single memory address location is decoded during execution of the first word in order to determine whether the second word is a NO-OP instruction. If the second word of a pair is not a NO-OP instruction, the second word is executed upon completion of execution of the first word of the pair and memory address control signals for the obtaining of a next succeeding instruction will be generated during execution of the second word of the pair.

If the second word of a pair is a NO-OP instruction, the necessary memory address control signals for obtaining a next instruction word from memory are generated during execution of the first instruction word of the pair, and the newly obtained instruction is executed upon completion of execution of the first instruction without execution of the second word of the pair.

In accordance with one feature of this invention, the second word of a pair of instruction words is decoded during execution of the first word, and under certain conditions a next instruction word is executed without executing the second word of a pair of instruction words.

GENERAL DESCRIPTION

The illustrative embodiment of our invention comprises a computer system which employs both full word length and half word length instructions. The instructions are stored in a memory arrangement which comprises a plurality of memory address locations. Each memory address location comprises 24 bits, and either one 24-bit full word length instruction or two 12-bit half word length instructions are stored in each location. The instructions are stored in the memory subject to the restriction that each full word length instruction must be individually assigned to a memory address location. Any half word length memory spaces which remain unused due to this restriction are filled with dummy NO-OP half word instructions.

Figure 1:
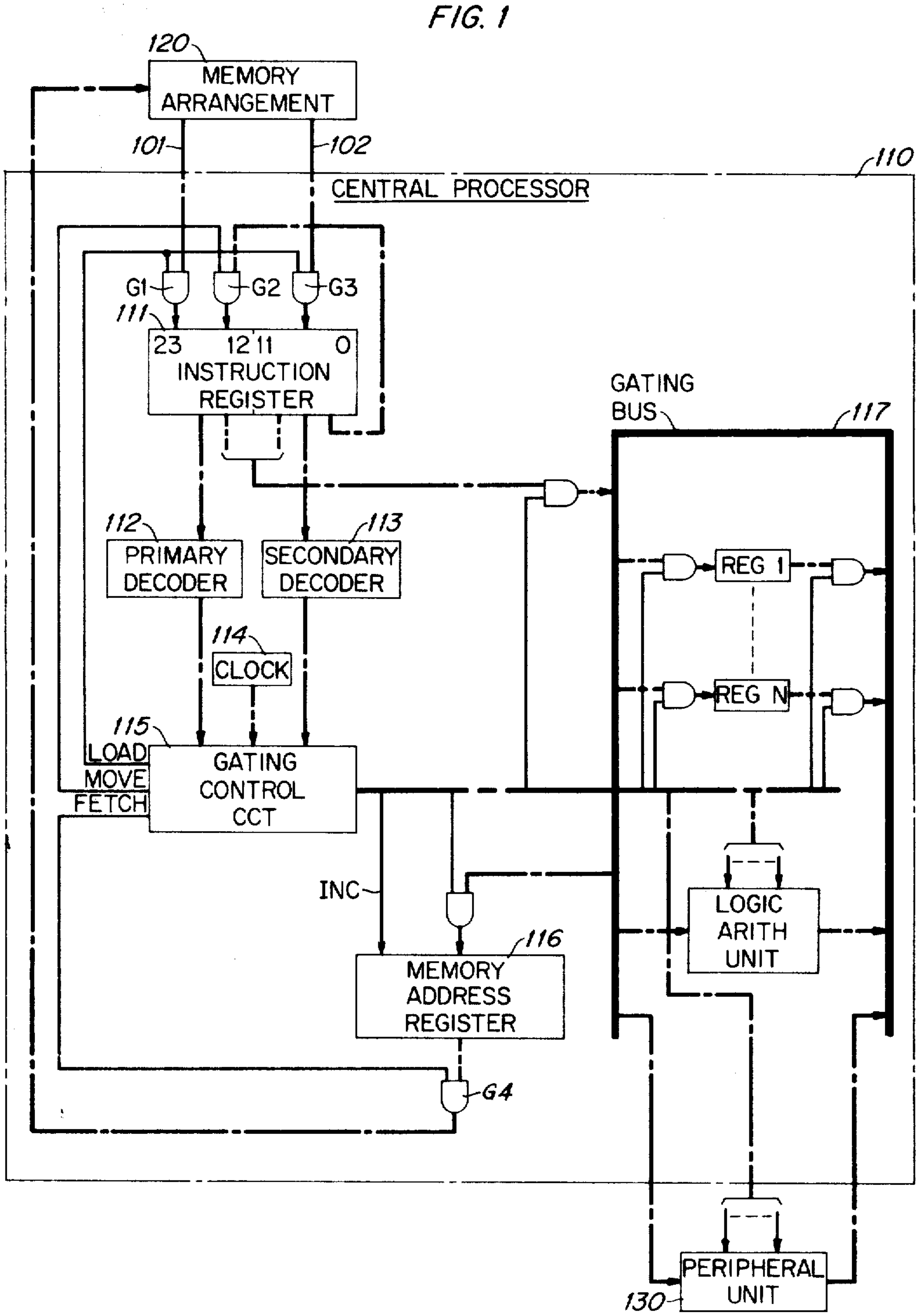
FIG. 1 is a general block diagram of the program controlled data processor employed as an illustrative embodiment of our invention.

FIG. 1 is an illustrative representation of the embodiment of this invention. The figure indicates that the illustrative embodiment comprises a Memory Arrangement 120, a Central Processor 110, and a Peripheral Unit 130. The Central Processor 110 has means for generating memory address control signals which comprise address information defining a specific memory address location. The memory address is contained in the Central Processor 110 in the Memory Address Register 116 and is transmitted to the Memory Arrangement 120 via the symbolic AND Gate G4 under control of signals, generated by the Gating Control Circuit 115, on the control conductor labelled FETCH. The Memory Arrangement 120, in response to memory address control signals, transmits the contents of the memory location defined by the address to the Central Processor over Conductor Groups 101 and 102. The information appearing on each of the Conductor Groups 101 and 102 represents either one half of a full word length instruction or a complete half word length instruction. Information on Conductor Groups 101 and 102 is gated into the Instruction Register 111 via AND Gates G1 and G3, respectively, under control of signals generated in the Gating Control Circuit 115 on the control conductor labelled LOAD.

When the 24-bit word in the Instruction Register 111 is a full word length instruction, the instruction is decoded in the Primary Decoder 112. Output signals from the Primary Decoder 112 are combined in the Gating Control Circuit 115 with output signals from the Clock Circuit 114 to generate a plurality of control pulses on the output conductors of the Gating Control Circuit 115. These control pulses are used throughout the Central Processor 110 for the implementation of the functions dictated by the instruction and for the selective generation and transmission of memory address control signals. During the execution of the 24-bit full word length instruction, a pulse is generated by the Gating Control Circuit 115 on the FETCH control conductor which, as described later herein, activates AND Gate G4 to transmit a new address from the Memory Address Register 116 to the Memory Arrangement 120 in order to obtain a next instruction or pair of instructions. A new address may be formed in the Memory Address Register 116 by incrementing the present contents or by gating a new address to the register via the Gating Bus 117. Upon completion of execution of the 24-bit instruction, the Gating Control Circuit 115, as described later herein, generates a pulse on the LOAD control conductor which gates the memory response into the Instruction Register 111 via AND Gates G1 and G3.

In case the 24-bit word stored in the Instruction Register 111 comprises a pair of half word length instructions of 12 bits each, both instructions are decoded simultaneously. The first of the pair of instruction words is stored in the left-hand half of the Instruction Register 111 and is decoded in the Primary Decoder 112; the second of the pair of instruction words is stored in the right-hand half and is decoded in the Secondary Decoder 113. Output signals from the Primary Decoder 112 are employed in the Gating Control Circuit 115 to generate the control pulses necessary for the execution of the first instruction. As described in greater detail in the Detailed Description if the output of the Secondary Decoder 113 does not indicate that the second instruction is the NO-OP instruction, the Gating Control Circuit 115 generates a pulse on the MOVE control conductor upon completion of the execution of the first instruction to gate the second instruction from the right-hand half into the left-hand half of the Instruction Register 111 via AND Gate G2. Subsequently, the second instruction is decoded in the Primary Decoder 112 and the control pulses necessary for the execution of the second instruction are generated in the Gating Control Circuit 115. During execution of the second instruction a pulse is generated on the FETCH control conductor to transmit a new address to memory. The corresponding 24-bit memory response is gated into the Instruction Register 111 upon completion of execution of the second instruction under control of a pulse on the conductor LOAD.

If the Secondary Decoder 113 produces an output which indicates that the second instruction is the NO-OP instruction, the FETCH control conductor is activated during execution of the first instruction and a new address is transmitted to memory. Additionally, the LOAD control conductor is activated upon completion of execution of the first instruction to gate the memory response into the Instruction Register 111 without moving the NO-OP instruction from the right-hand half into the left-hand half of the register.

DETAILED DESCRIPTION

Figure 2:
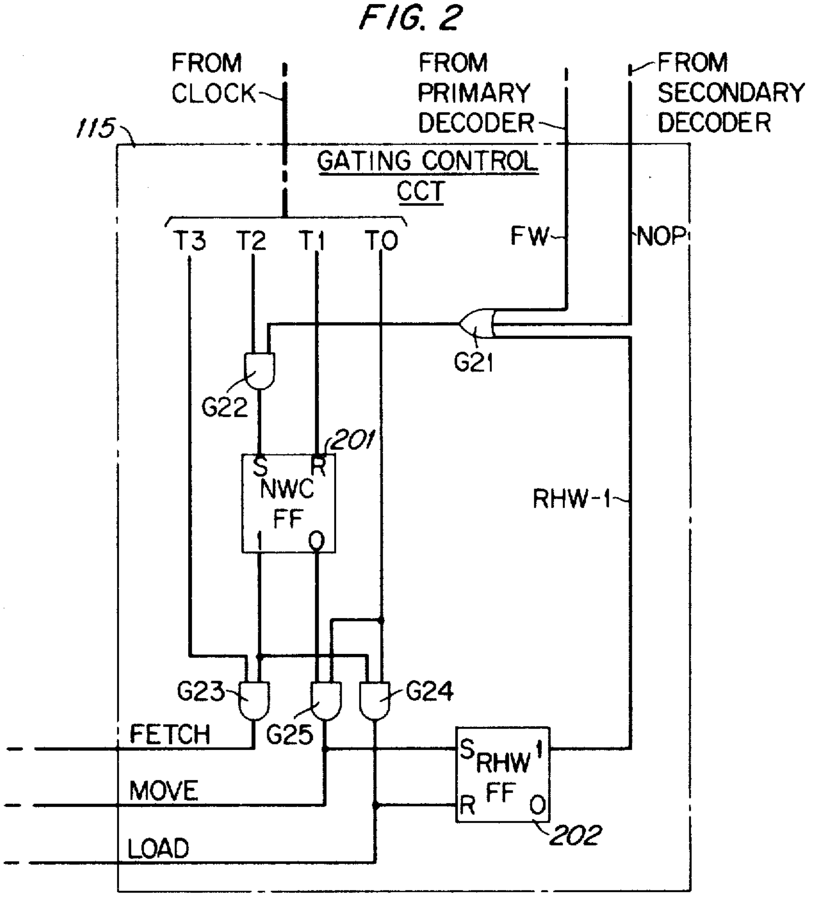
FIG. 2 represents one specific implementation of the invention.

Shown in FIG. 2 is the circuitry necessary to generate control pulses on the three control conductors FETCH, LOAD, and MOVE which are employed to control the transmission of memory address control signals, the receiving of instructions from memory, and the moving of an instruction from the right-hand half of the Instruction Register 111 to the left-hand half, respectively.

Figure 3:
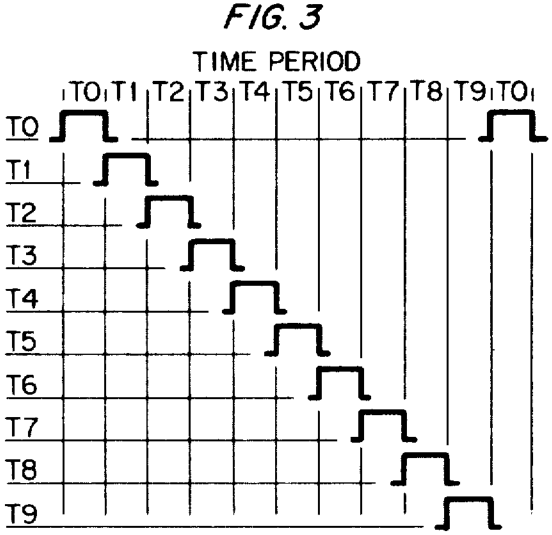
FIG. 3 shows the relationship between clock signals and the time periods of a machine cycle of the illustrative processor.

To generate the appropriate control pulses on the above-mentioned control conductors, outputs from the Clock Circuit 114 and from the Primary Decoder 112 and the Secondary Decoder 113 are logically combined in the Gating Control Circuit 115. A specific implementation of the Clock Circuit 114, the Primary Decoder 112, and the Secondary Decoder 113 is not shown in the drawing as these circuits are well known in the art. Only that portion of the Gating Control Circuit 115 which is uniquely associated with the implementation of this invention is shown in FIG. 2 and is described herein. The machine cycle of the Central Processor 110, which is defined as the time required to execute a single instruction, has been divided into ten equal duration time periods designated as T0 through T9 as shown in FIG. 3. The set of output signals generated by the Clock Circuit 114 comprises the Clock Signals T0, T1, T2, etc., each having the duration of one-tenth of a machine cycle, which are employed in the Gating Control Circuit 115. The Primary Decoder 112 produces an output signal on the Conductor FW if the instruction in the Instruction Register 111 is a full word instruction as indicated by the operational code of the instruction. The Secondary Decoder 113 decodes the information stored in that portion of the Instruction Register 111 assigned to the operational code of the right-hand half word when two half word length instructions are stored in the Instruction Register 111, and produces an output signal on the Conductor NOP if the operational code of the NO-OP instruction is in the decoded portion of the register.

Also shown in FIG. 2 are the NWC flip-flop 201 and the RHW flip-flop 202 which are bistable memory elements commonly referred to as R-S flip-flops. A signal of sufficient magnitude on the R input terminal causes the flip-flop to change to its "0" state or to remain in its "0" state if it was in that state prior to the occurrence of the signal, while a sufficient magnitude signal on the S input terminal causes the flip-flop to change to its "1" state or to remain in the "1" state.

Assuming that a new instruction word is gated into the register at time T0, only one of three possible conditions can exist, namely: (1) The Instruction Register 111 contains one full word length instruction, (2) The Instruction Register 111 contains two half word length instructions, and the right-hand word is the NO-OP instruction, (3) The instruction Register 111 contains two half word length instructions and the right-hand word is not the NO-OP instruction.

Figure 4:
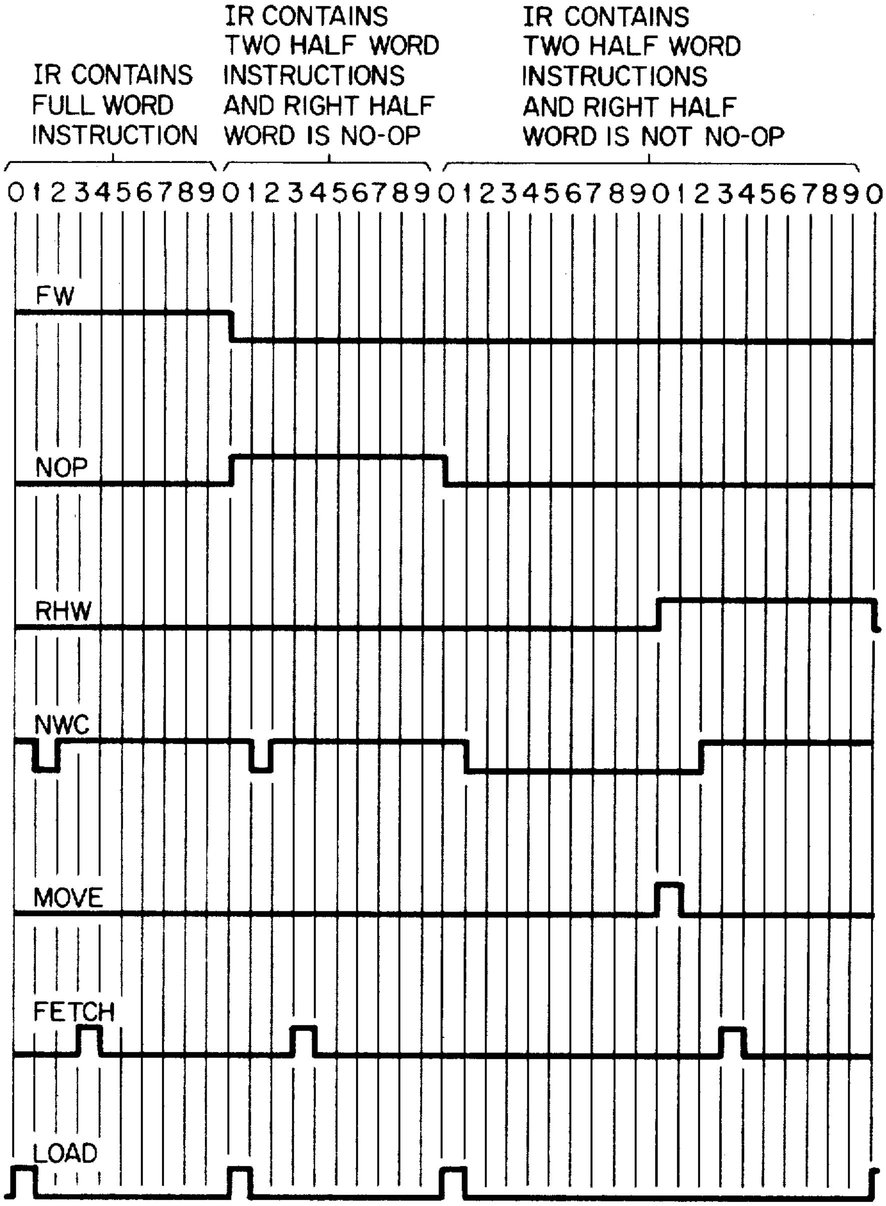
FIG. 4 shows the occurrence of control pulses on a relative time scale for three different combinations of instructions obtained from memory.

FIG. 4 shows the activation of the Decoder Outputs FW and NOP, the operation of the Flip-Flops NWC and RHW 201 and 202, and the activation of the Control Conductors MOVE, FETCH, and LOAD on a relative time scale for each of the above-mentioned three conditions. As shown in FIG. 2, the Clock Conductor T1 is connected to the R input terminal of the NWC flip-flop 201. A clock signal on Conductor T1 causes the NWC flip-flop 201 to be reset at time T1 of each machine cycle. The NWC flip-flop 201 is set to its "1" state at time T2 if the output of the OR Gate G21 is active, by combining the signanls on the Conductor T2 and the output of OR Gate G21 in AND Gate G22. The output of OR Gate G21 is active when either of the Decoder Outputs FW or NOP is active or if the RHW flip-flop 202 is set.

If the Instruction Register 111 contains a full word length instruction, the Conductor FW is active and the NWC flip-flop 201 is set at T2 of the time cycle assigned for execution of the full word length instruction. If the Instruction Register 111 contains a pair of half word length instructions and the right-hand word is the NO-OP instruction, the Decoder Output NOP is active, and the NWC flip-flop 201 is set at time T2 of the time cycle assigned for execution of the first instruction of the pair. If the Instruction Register 111 contains a pair of half word length instructions and the right-hand word is not the NO-OP instruction, the RHW flip-flop 202 is set when the second instruction of the pair is transferred from the right-hand side to the left-hand side of the Instruction Register 111 in response to a control signal on the Conductor MOVE. Subsequently, the NWC flip-flop 201 is set at time T2 of the time cycle assigned for execution of the second instruction of the pair as a consequence of the RHW flip-flop 202 being in its set state.

When the NWC flip-flop 201 is set at time T2, the Control Conductor FETCH is activated at the immediately following time T3 via AND Gate G23 to transmit a new address to memory, and the Control Conductor LOAD is activated at time TO of the immediately following time cycle via AND Gate G24 to gate the memory response into the Instruction Register 111. When the NWC flip-flop 201 is reset, the Control Conductor MOVE is activated at time T0 to gate the contents of the right-hand side of the Instruction Register 111 into the left-hand side. Thus, the actions which occur after the NWC flip-flop 201 is set are independent of which conductor (i.e., FW, NOP, or RHW-1) was active to enable OR Gate G21.

In summary, if the word obtained from memory and stored in the Instruction Register 111 comprises one full word length instruction nor if it comprises two half word length instructions and the right-hand half word is the NO-OP instruction, the FETCH control conductor is activated during T3 of the first cycle after receipt of the memory word, and the LOAD contnrol conductor is activated during T0 of the immediately succeeding machine cycle. If the word obtained from memory comprises two half word length instructions, and the right-hand half word is not the NO-OP instruction, the MOVE conductor is activated at time T0 after completion of execution of the first instruction of the pair, the FETCH conductor is activated during T3 of the cycle assigned to execution of the second instruction of the pair, and the LOAD conductor is activated during time T0 of the next cycle.

It is to be understood that the above-described arrangement is merely illustrative of the application of the principles of the invention; numerous other arrangements may be devised by those skilled in the art without departing from the spirit and scope of the invention.

What is claimed is:

1. A data processor comprising:
a memory arrangement for storing instruction words and comprising a plurality of locations, certain of said plurality of locations each containing a pair of instruction words;
execution means for executing instruction words;
control means for selectively obtaining the contents of said locations for said execution means;
means for decoding a second instruction word of a pair of instruction words during execution of a first instruction word of said pair of instruction words and for selectively generating a control signal; and
means responsive to said control signal for causing said control means to obtain a next instruction word for said execution means without execution of said second instruction word.

2. A program controlled data processor comprising:
a control arrangement;
a memory arrangement comprising a plurality of locations, certain of said locations each containing a pair of half word length instructions, each of said instructions being represented by a unique binary code,
said memory arrangement being responsive to memory control signals for transmitting to said control arrangement the contents of memory locations defined by said control signals;
said control arrangement comprising:
register means comprising first and second parts for storing respective half word length instructions obtained from said memory locations,
first decoder means connected to said first part of said register means for generating processor control output signals in accordance with output signals of said first part,
second decoder means connected to said second part of said register means for selectively generating second decoder output signals in response to output signals of said second part corresponding to predetermined ones of said binary codes,
gating means responsive to MOVE signals for moving a half word length instruction from said second part to said first part of said register means,
address means responsive to FETCH signals for generating and transmitting said memory control signals,
control means for generating said MOVE signals and said FETCH signals in an alternating sequence, and
said control means being responsive to said second decoder output signals for consecutively generating said FETCH signals without generating said MOVE signals.

3. A data processor in accordance with claim 2 wherein said control arrangement further comprises means for generating clock signals defining execution time cycles and time periods within said time cycles, and
wherein said control means is responsive to said clock signals to generate said MOVE signals upon conclusion of the first time cycle after receipt of a pair of instructions from said memory arrangement and to generate said FETCH signals during the second time cycle after receipt of said pair of instructions, and
said control means is responsive to said second decoder output signals and said clock signals to generate said FETCH signals during said first time cycle without generating said MOVE signals.

4. A program controlled data processor comprising:
execution means for sequentially executing the instruction words of a sequence,
a memory arrangement responsive to memory control signals for transmitting to said execution means the contents of memory locations as defined by said memory control signals,
certain of said memory locations each containing a group of instruction words,
control means for selectively generating said memory control signals, and
means for decoding a second instruction word of said group of instruction words during execution of a first instruction word of said group,
said control means being responsive to said decoding means for generating memory control signals for selectively causing said memory arrangement to transmit a next instruction word to said execution means prior to execution of said second instruction word.

5. A program controlled data processor comprising:
a control arrangement; and
a memory arrangement comprising a plurality of locations, certain of said locations each containing a pair of half word length instructions, said memory arrangement being responsive to memory control signals for transmitting to said control arrangement the contents of memory locations defined by said control signals;
said control arrangement comprising:
register means comprising first and second parts for storing the first and second instructions respectively of a pair of half word instructions obtained from said memory locations, first decoder means connected to said first part of said register means for generating instruction execution signals in accordance with output signals of said first part, second decoder means connected to said second part of said register means for selectively generating second decoder output signals in accordance with output signals of said second part, clock means for generating clock signals defining execution time cycles and time periods within said time cycles, gating means responsive to MOVE control signals for moving a half word length instruction from said second part to said first part of said register means, address means responsive to FETCH control signals for generating and transmitting said memory control signals, first and second memory means each having first and second stable states, gating circuits connected to said first memory means and responsive to output signals of said first memory means and said clock signals for generating said MOVE control signals and signals for setting said second memory means to said first stable state when said first memory means is in said second stable state and for generating said FETCH control signals and signals for resetting said second memory means to said second stable state when said first memory means is in said first stable state, said first memory means being reset to said second stable state in response to certain of said clock signals occurring during a first portion of each of said time cycles, and means responsive to said second decoder output signals, said first stable state of said second memory means, and said clock signals for setting said first memory means to said first stable state.

References Cited

UNITED STATES PATENTS

| | | | |
|---|---|---|---|
| 3,012,725 | 12/1961 | Williams et al. | 235—157 |
| 3,340,513 | 9/1967 | Kinzie et al. | 340—172.5 |
| 3,354,430 | 11/1967 | Zeitler, Jr. et al. | 340—172.5 |
| 3,401,376 | 3/1968 | Barnes et al. | 340—172.5 |
| 3,500,337 | 3/1970 | Womack. | |

PAUL J. HENON, Primary Examiner

H. E. SPRINGBORN, Assistant Examiner